US008674970B2

(12) United States Patent
Shin

(10) Patent No.: US 8,674,970 B2
(45) Date of Patent: Mar. 18, 2014

(54) SCAN DRIVER AND FLAT PANEL DISPLAY USING THE SAME

(75) Inventor: Byung Hyuk Shin, Yongin (KR)

(73) Assignee: Samsung Display Co., Ltd., Yongin-si (KR)

( * ) Notice: Subject to any disclaimer, the term of this patent is extended or adjusted under 35 U.S.C. 154(b) by 227 days.

(21) Appl. No.: 13/246,766

(22) Filed: Sep. 27, 2011

(65) Prior Publication Data

US 2012/0169678 A1 Jul. 5, 2012

(30) Foreign Application Priority Data

Jan. 5, 2011 (KR) ........................ 10-2011-0000887

(51) Int. Cl.
*G06F 3/038* (2013.01)
*G09G 5/00* (2006.01)

(52) U.S. Cl.
USPC ........................................................ 345/204

(58) Field of Classification Search
None
See application file for complete search history.

(56) References Cited

U.S. PATENT DOCUMENTS 5,844,534 A * 12/1998 Okumura et al. ............... 345/90

FOREIGN PATENT DOCUMENTS

| | | |
|---|---|---|
| JP | 2004-302320 | 10/2004 |
| KR | 10-2000-0071429 A | 11/2000 |
| KR | 10-2004-0088240 A | 10/2004 |

* cited by examiner

*Primary Examiner* — Nicholas Lee
(74) *Attorney, Agent, or Firm* — Christie, Parker & Hale, LLP

(57) ABSTRACT

A flat panel display (FPD) includes: a timing controller configured to supply a mode control signal and a scan control signal; a plurality of pixels coupled to a plurality of scan lines and a plurality of data lines; a data driver for supplying a plurality of data signals to the data lines, and a scan driver coupled to the scan lines and including a plurality of scan integrated circuits (ICs), each of the scan ICs being configured to supply a plurality of scan signals to corresponding ones of the scan lines, wherein the timing controller is configured to select of the scan ICs in accordance with the mode control signal and wherein the timing controller is further configured to control a corresponding scan signal of the scan signals to be supplied to one of the scan lines coupled to the scan IC selected in accordance with the scan control signal.

9 Claims, 4 Drawing Sheets

FIG. 4

| SCS | MCS | MCS=00 | MCS=01 | MCS=10 | MCS=11 |
|---|---|---|---|---|---|
| 0 | 00 FIRST SCAN IC | 0 | Not select | Not select | Not select |
| 1 | | 1 | Not select | Not select | Not select |
| --- | | --- | Not select | Not select | Not select |
| 268 | | 268 | Not select | Not select | Not select |
| 269 | | 269 | Not select | Not select | Not select |
| 0 | 01 SECOND SCAN IC | Not select | 0 | Not select | Not select |
| 1 | | Not select | 1 | Not select | Not select |
| --- | | Not select | --- | Not select | Not select |
| 268 | | Not select | 268 | Not select | Not select |
| 269 | | Not select | 269 | Not select | Not select |
| 0 | 10 THIRD SCAN IC | Not select | Not select | 0 | Not select |
| 1 | | Not select | Not select | 1 | Not select |
| --- | | Not select | Not select | --- | Not select |
| 268 | | Not select | Not select | 268 | Not select |
| 269 | | Not select | Not select | 269 | Not select |
| 0 | 11 FOURTH SCAN IC | Not select | Not select | Not select | 0 |
| 1 | | Not select | Not select | Not select | 1 |
| --- | | Not select | Not select | Not select | --- |
| 268 | | Not select | Not select | Not select | 268 |
| 269 | | Not select | Not select | Not select | 269 |

SCAN DRIVER AND FLAT PANEL DISPLAY USING THE SAME

CROSS-REFERENCE TO RELATED APPLICATION

This application claims priority to and the benefit of Korean Patent Application No. 10-2011-0000887, filed on Jan. 5, 2011 in the Korean Intellectual Property Office, the entire content of which is incorporated herein by reference.

BACKGROUND

1. Field

Embodiments of the present invention relate to a scan driver and a flat panel display using the same.

2. Description of the Related Art

Recently, various flat panel displays (FPDs) that are lighter in weight and thinner than comparable cathode ray tubes (CRTs) have been developed. The FPDs include liquid crystal displays (LCDs), field emission displays (FEDs), plasma display panels (PDPs), and organic light emitting displays.

The FPD commonly includes pixels arranged in a matrix format, a data driver for driving data lines coupled to the pixels, and a scan driver for driving scan lines coupled to the pixels.

The scan driver sequentially supplies scan signals to scan lines to select pixels in units of lines (e.g., rows). The data driver supplies data signals to data lines in synchronization with the scan signals. Then, the data signals are supplied to the pixels selected by the scan signals. The pixels charge (or store) the voltages corresponding to the data signals and generate light having brightness corresponding to the charged voltages.

SUMMARY

In order to display an image with improved picture quality by the FPD, various of driving methods have been suggested. Some suggested driving methods are not compatible with a scan driver that sequentially supplies the scan signals to the scan lines. Therefore, a scan driver capable of sequentially or non-sequentially supplying the scan signals is desired.

Aspects of embodiments of the present invention are directed toward a scan driver capable of controlling the supply order of scan signals and a flat panel display using the same Accordingly, embodiments of the present invention have been made to provide a scan driver capable of sequentially or non-sequentially supplying scan signals and a flat panel display (FPD) using the same.

According to one embodiment of the present invention, a flat panel display (FPD) includes a timing controller configured to supply a mode control signal and a scan control signal, a plurality of pixels coupled to a plurality of scan lines and a plurality of data lines, a data driver configured to supply a plurality of data signals to the data lines, and a scan driver coupled to the scan lines and including a plurality of scan integrated circuits (ICs), each of the scan ICs being configured to supply a plurality of scan signals to corresponding ones of the scan lines, wherein the timing controller is configured to select one of the scan ICs in accordance with the mode control signal and wherein the timing controller is further configured to control a corresponding scan signal of the scan signals to be supplied to a specific scan line of the scan lines coupled to the selected one of the scan ICs in accordance with the scan control signal.

Each of the scan ICs may include a mode controller configured to select a specific mode, a decoder configured to receive the mode control signal and the scan control signal and to supply a select signal to a specific channel of a plurality of channels in accordance with the scan control signal when the mode control signal is the same as the specific mode, and a level converter configured to change the voltage of the select signal to generate the scan signal. The FPD may further include a buffer coupled to the level converter and configured to transmit the corresponding scan signal to the specific scan line corresponding to the specific channel. The specific mode selected by the mode controller may be different for each of the ICs. The mode control signal and the scan control signal may be data including a plurality of bits.

According to another embodiment of the present invention, a scan driver includes a plurality of scan ICs, each of the scan ICs including a mode controller configured to select a specific mode, a decoder configured to receive a mode control signal and a scan control signal from the outside and to supply a select signal to a specific channel of a plurality of channels in accordance with the scan control signal when the mode control signal is the same as the specific mode, and a level shifter configured to change the voltage of the select signal.

In the scan driver according to embodiments of the present invention and the FPD using the same, a scan line to which a scan signal may be supplied may be selected using data (a mode control signal and a scan control signal) supplied by the timing controller.

BRIEF DESCRIPTION OF THE DRAWINGS

The accompanying drawings, together with the specification, illustrate exemplary embodiments of the present invention, and, together with the description, serve to explain the principles of the present invention.

FIGS. 4 and 5 are views illustrating channels selected by a mode control signal and a scan control signal according to embodiments of the present invention.

DETAILED DESCRIPTION

Figure 1:
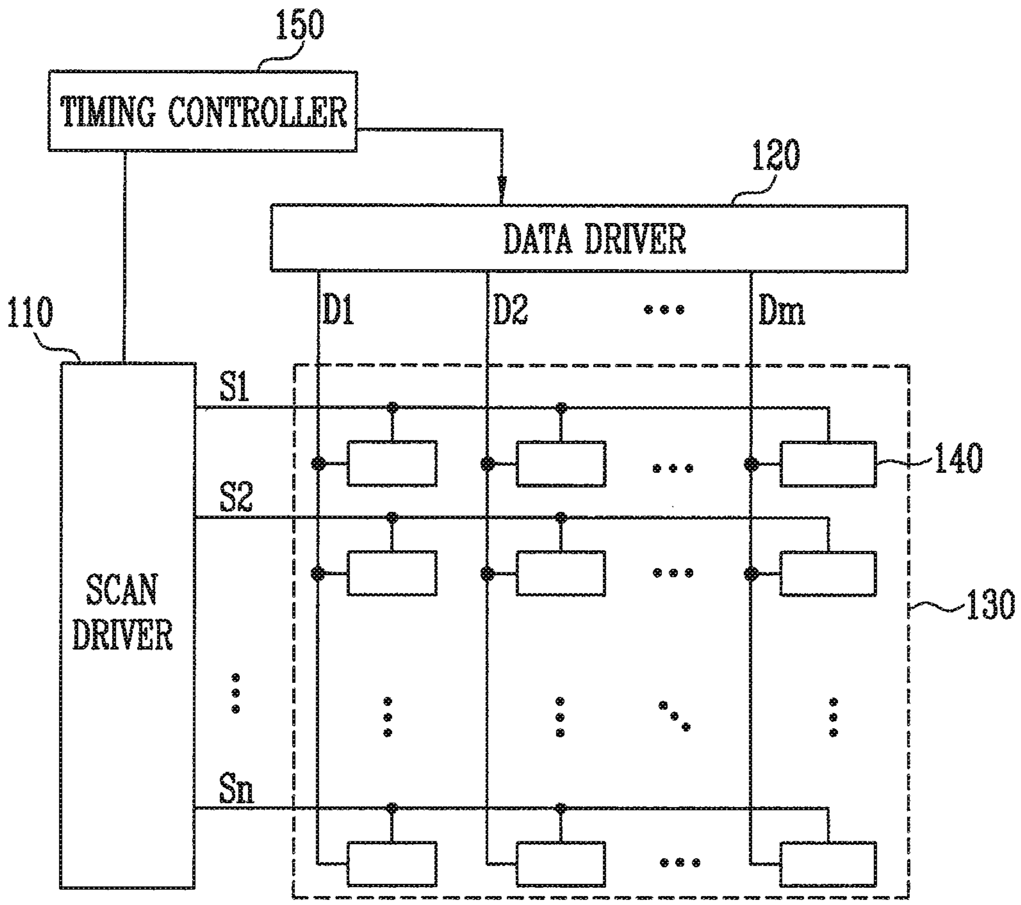
FIG. 1 is a view illustrating a flat panel display (FPD) according to an embodiment of the present invention.

Hereinafter, certain exemplary embodiments according to the present invention will be described with reference to the accompanying drawings. Here, when a first element is described as being coupled to a second element, the first element may be not only directly coupled to the second element but may also be indirectly coupled to the second element via a third element. Further, some of the elements that are not essential to the complete understanding of the invention are omitted for clarity. Also, like reference numerals refer to like elements throughout.

Hereinafter, exemplary embodiments of the present invention, by which those who skilled in the art may easily perform the present invention, will be described in detail with reference to FIGS. 1 to 5.

FIG. 1 is a view illustrating a flat panel display (FPD) according to an embodiment of the present invention.

Referring to FIG. 1, the FPD according to one embodiment of the present invention includes a display unit 130 including pixels 140 at the crossing regions of scan lines S1 to Sn and data lines D1 to Dm, a scan driver 110 for driving the scan lines S1 to Sn, a data driver 120 for driving the data lines D1 to Dm, and a timing controller 150 for controlling the scan driver 110 and the data driver 120.

The pixels 140 are selected when corresponding scan signals are supplied to charge (or store) the voltages corresponding to data signals. The pixels 140 that charge the voltages corresponding to the data signals supply light with brightness (e.g., predetermined brightness) to the outside in accordance with the data signals.

The scan driver 110 supplies the scan signals to the scan lines S1 to Sn. Here, the scan driver 110 sequentially or non-sequentially supply the scan signals in accordance with the control of the timing controller 150. When the scan signals are supplied from the scan driver 110, the pixels 140 are selected in units of lines (e.g., rows).

The data driver 120 supplies the data signals to the data lines D1 to Dm in synchronization with the scan signals. The data signals supplied to the data lines D1 to Dm are supplied to the pixels 140 selected by the scan signals.

The timing controller 150 controls the scan driver 110 and the data driver 120. In particular, as illustrated in the embodiment shown in FIG. 2, the timing controller 150 supplies a mode control signal MCS and a scan control signal SCS to the scan driver 110 to select a scan line (one of S1 to Sn) to which a scan signal is to be supplied.

Figure 2:
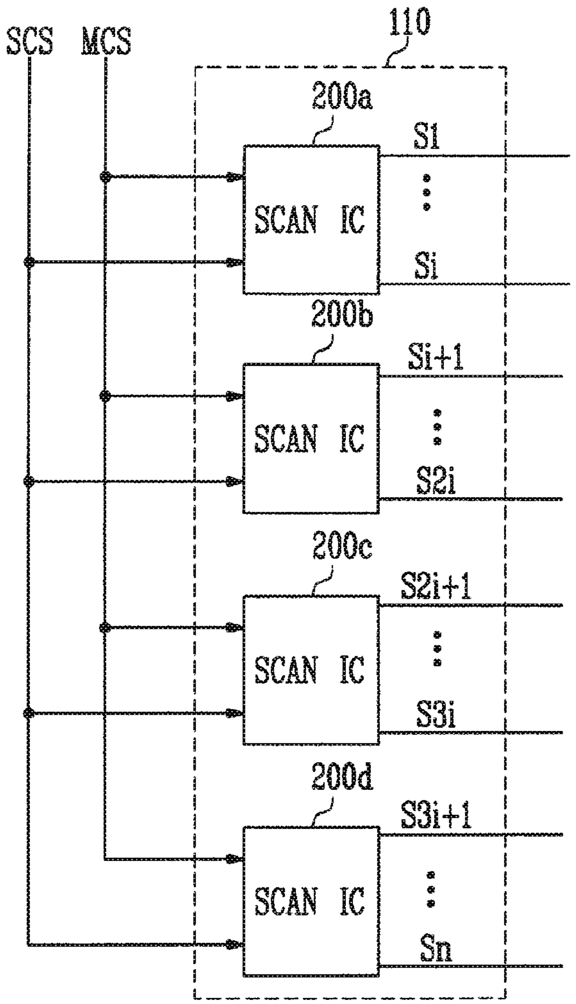
FIG. 2 is a view illustrating the scan driver of FIG. 1 according to one embodiment of the present invention.

FIG. 2 is a view illustrating the scan driver of FIG. 1 according to one embodiment of the present invention.

Referring to FIG. 2, the scan driver 110 includes a plurality of scan integrated circuits (IC) 200_a_, 200_b_, 200_c_, and 200_d_. For example, when 1,080 scan lines are provided in the display unit 130, the scan driver 110 may include four scan ICs 200_a_ to 200_d_ each having 270 channels (each channel corresponding to a line).

Each of the scan ICs 200_a_ to 200_d_ receives the mode control signal MCS and the scan control signal SCS from the timing controller 150. Here, the mode control signal MCS is used for selecting one of the plurality of scan ICs 200_a_ to 200_d_, and the scan control signal SCS is used for selecting one of the plurality of channels. Therefore, one of the plurality of scan ICs 200_a_ to 200_d_ that received the mode control signal MCS supplies a scan signal to a specific scan line coupled thereto in accordance with the scan control signal SCS.

In one embodiment, the mode control signal MCS is set as 2 bit data so that one of the four scan ICs 200_a_ to 200_d_ may be selected, and the scan control signal SCS may be set as 9 bit data so that one of the 270 channels may be selected. The mode control signal MCS and the scan control signal SCS together as 11 bit data may be supplied to the scan ICs 200_a_ to 200_d_. Here, in one embodiment, the upper 2 bits are used as data of the mode control signal MCS, and the lower 9 bits are used as data of the scan control signal SCS.

According to embodiments of the present invention, the mode control signal MCS may have a number of bits corresponding to the number of scan ICs included in the scan driver 110, and the scan control signal SCS may be set to have various suitable bits in accordance with the number of channels of the scan ICs.

Figure 3:
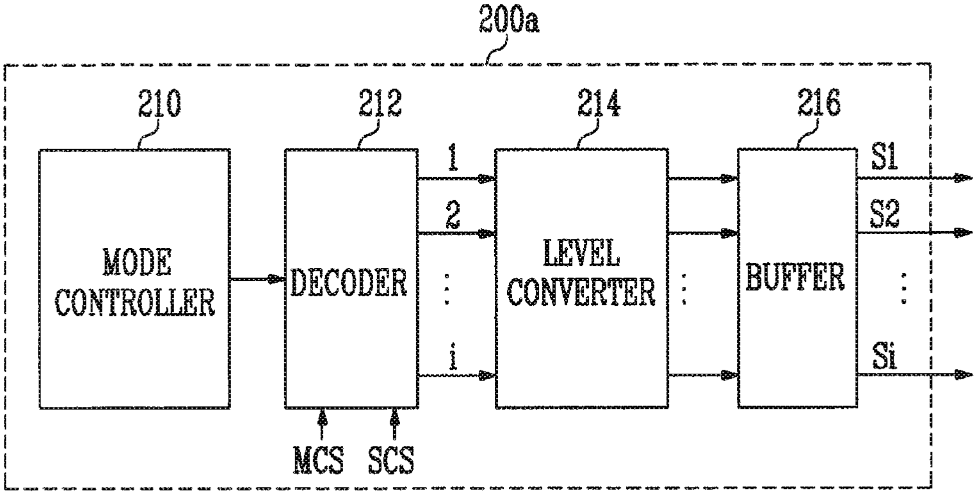
FIG. 3 is a view illustrating the scan integrated circuit (IC) of FIG. 2 according to one embodiment of the present invention.

FIG. 3 is a view illustrating the scan integrated circuit (IC) of FIG. 2 according to one embodiment of the present invention. In FIG. 3, for convenience sake, the first scan IC 200_a_ will be illustrated.

Referring to FIG. 3, according to one embodiment of the present invention, the scan IC 200_a_ includes a mode controller 210, a decoder 212, a level converter 214, and a buffer 216.

The mode controller 210 selects a mode that may control the scan IC 200_a_ to operate in a mode in accordance with the mode control signal MCS. For example, in one embodiment of the present invention, the mode controller 210 includes two switches and one of modes “00”, “01”, “10”, and “11” may be selected using the switches. That is, the mode controller 210 included in each of the scan ICs 200_a_ to 200_d_ supplies different mode signals to the decoder 212.

convenience’ sake, it is assumed that the mode controller 210 of the first scan IC 200_a_ is set as “00” and that the mode controller 210 of the second scan IC 200_b_ is set as “01”. In addition, it is assumed that the mode controller 210 of the third scan IC 200_c_ is set as “10” and that the mode controller 210 of the fourth scan IC 200_d_ is set as “11”.

The decoder 212 receives the mode control signal MCS and the scan control signal SCS and determines whether the specific mode set by the mode controller 210 coincides with (e.g., matches) the mode of the mode control signal MCS. When the set mode coincides with the mode of the mode control signal MCS, the decoder 212 supplies a select signal to a specific channel in accordance with the scan control signal SCS.

In more detail, in one embodiment of the present invention, the decoder 212 that receives the mode control signal MCS determines whether the bit of the mode control signal coincides with a bit (that is, a specific mode) from the mode controller 210. Here, when the bit (for example, “00”) of the mode control signal coincides with the bit (“00”) of the mode controller 210, the select signal is supplied to the channel corresponding to the scan control signal SCS. For example, when the scan control signal SCS is set to have the bit corresponding to the channel of “100”, the decoder 212 supplies the select signal to a $100^{th}$ channel.

On the other hand, when the bit of the mode control signal does not coincide with the bit of the mode controller 210, the decoder 212 does not supply the select signal regardless of the scan control signal SCS.

The level converter 214 changes the voltage of the select signal supplied from the decoder 212 to supply the voltage to the buffer 216. For example, the level converter 214 changes the voltage of the control signal to a voltage at which the transistors included in the pixel 140 can be turned on and supplies the voltage at which the transistors included in the pixel can be turned on to the buffer 216. Here, the control signal supplied to a kth (k is a natural number) channel is supplied to the buffer 216 of the kth channel after the voltage is changed.

The buffer 216 transmits the select signal supplied from the level converter 214 to a kth scan line Sk. At this time, the select signal supplied to the kth scan line Sk is supplied to the pixels 140 (e.g., the pixels coupled to the kth scan line Sk) as a scan signal.

Figure 5:
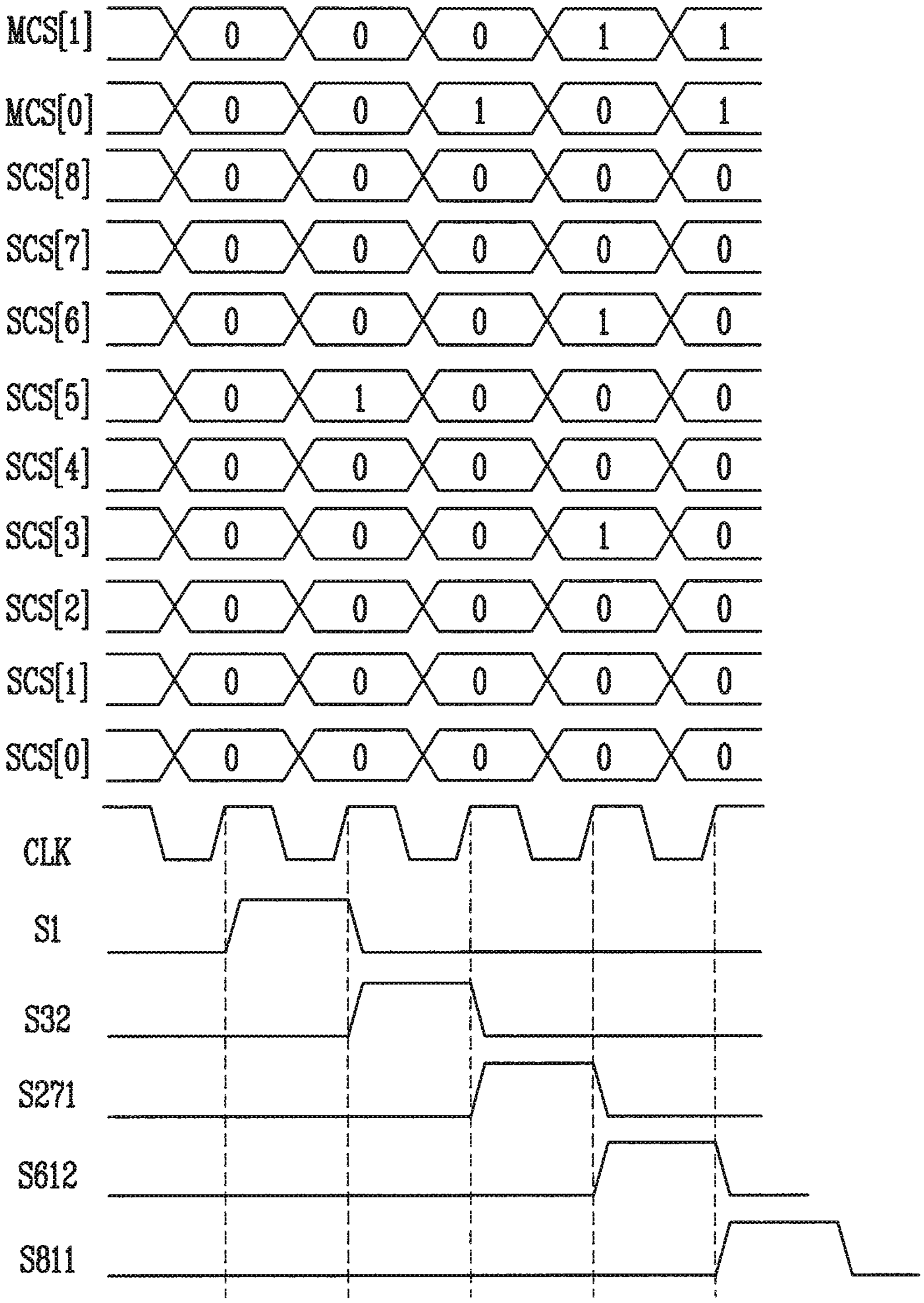

FIGS. 4 and 5 are views illustrating channels selected by a mode control signal and a scan control signal.

Referring to FIG. 4, the scan ICs 200_a_, 200_b_, 200_c_, and 200_d_ (labeled in FIG. 4 as “first,” “second,” “third,” and “fourth” scan IC, respectively) are selected by the mode control signal MCS of “00”, “01”, “10”, and “11”. The scan ICs 200_a_ to 200_d_ selected by the mode control signal MCS supply scan signals to specific channels in accordance with the scan control signal SCS.

In accordance with one embodiment of the present invention, first, the timing controller 150 supplies the mode control signal MCS and the scan control signal SCS so that a scan signal may be supplied to a specific scan line and that the scan IC (e.g., one of 200_a_ to 200_d_) coupled to the specific scan line and the specific scan line may be selected.

When the mode control signal MCS is supplied, the scan IC (one of 200*a* to 200*d*) having the same bit (or mode) as the mode control signal MCS is selected. The scan IC (one of 200*a* to 200*d*) selected by the mode control signal MCS supplies a scan signal to a specific scan line in accordance with the bit of the scan control signal SCS.

For example, as illustrated in FIG. 5, scan signals may be supplied in the order of a first scan line S1, a $32^{nd}$ scan line S32, a $271^{st}$ scan line S271, a $612^{th}$ scan line S612, and a $811^{th}$ scan line S811 by controlling the bits of the mode control signal MCS and the scan control signal SCS.

As described above, according to embodiments of the present invention, the scan signals may be sequentially or non-sequentially supplied to the scan lines S1 to Sn using the mode control signal MCS and the scan control signal SCS.

While the present invention has been described in connection with certain exemplary embodiments, it is to be understood that the invention is not limited to the disclosed embodiments, but, on the contrary, is intended to cover various modifications and equivalent arrangements included within the spirit and scope of the appended claims, and equivalents thereof.

What is claimed is:

1. A flat panel display (FPD), comprising:
- a timing controller configured to supply a mode control signal and a scan control signal;
- a plurality of pixels coupled to a plurality of scan lines and a plurality of data lines;
- a data driver configured to supply a plurality of data signals to the data lines; and
- a scan driver coupled to the scan lines and comprising a plurality of scan integrated circuits (ICs), each of the scan ICs being configured to supply a plurality of scan signals to corresponding ones of the scan lines,
- wherein the timing controller is configured to supply the mode control signal to each of the plurality of scan ICs and to select one of the scan ICs in accordance with the mode control signal,
- wherein each of the plurality of scan ICs is supplied with a same data of the mode control signal, and
- wherein the timing controller is further configured to control a corresponding scan signal of the scan signals to be supplied to a specific scan line of the scan lines coupled to the selected one of the scan ICs in accordance with the scan control signal.

2. A flat panel display, comprising:
- a timing controller configured to supply a mode control signal and a scan control signal;
- a plurality of pixels coupled to a plurality of scan lines and a plurality of data lines;
- a data driver configured to supply a plurality of data signals to the data lines; and
- a scan driver coupled to the scan lines and comprising a plurality of scan integrated circuits (ICs), each of the scan ICs being configured to supply a plurality of scan signals to corresponding ones of the scan lines,
- wherein the timing controller is configured to select one of the scan ICs in accordance with the mode control signal,
- wherein the timing controller is further configured to control a corresponding scan signal of the scan signals to be supplied to a specific scan line of the scan lines coupled to the selected one of the scan ICs in accordance with the scan control signal, and
- wherein each of the scan ICs comprises:
  - a mode controller configured to select a specific mode;
  - a decoder configured to receive the mode control signal and the scan control signal and to supply a select signal to a specific channel of a plurality of channels in accordance with the scan control signal when the mode control signal is the same as the specific mode; and
  - a level converter configured to change the voltage of the select signal to generate the scan signal.

3. The FPD as claimed in claim 2, further comprising a buffer coupled to the level converter and configured to transmit the corresponding scan signal to the specific scan line corresponding to the specific channel.

4. The FPD as claimed in claim 2, wherein the specific mode selected by the mode controller is different for each of the ICs.

5. The FPD as claimed in claim 2, wherein the mode control signal and the scan control signal are data comprising a plurality of bits.

6. A scan driver comprising a plurality of scan ICs, each of the scan ICs comprising:
- a mode controller configured to select a specific mode;
- a decoder configured to receive a mode control signal and a scan control signal from the outside and to supply a select signal to a specific channel of a plurality of channels in accordance with the scan control signal when the mode control signal is the same as the specific mode; and
- a level shifter configured to change the voltage of the select signal.

7. The scan driver as claimed in claim 6, further comprising a buffer coupled between the level shifter and a plurality of scan lines to supply the select signal as a scan signal to a specific scan line of the scan lines corresponding to the specific channel.

8. The scan driver as claimed in claim 6, wherein the specific mode selected by the mode controller is different for each of the ICs.

9. The scan driver as claimed in claim 6, wherein the mode control signal and the scan control signal are data comprising a plurality of bits.

* * * * *